F. B. Wells.
Binding Books.
Nº 83,345. Patented Oct. 20, 1868.
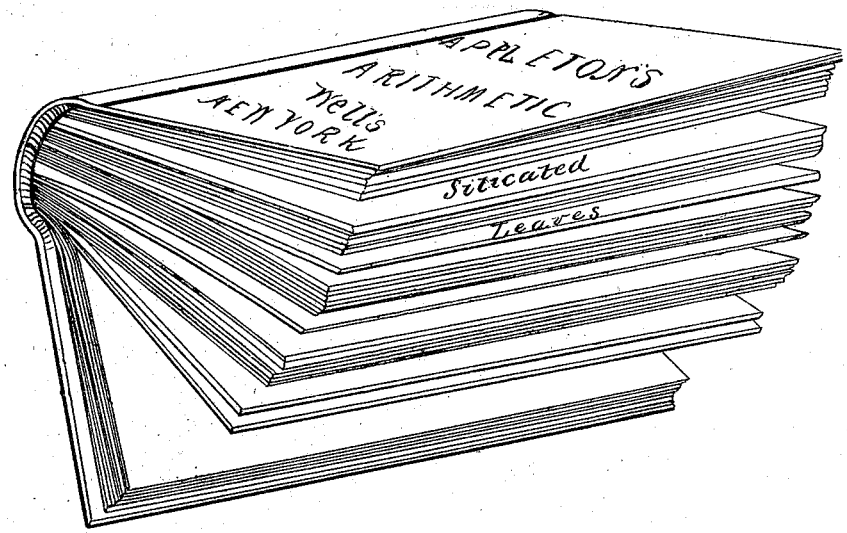

UNITED STATES PATENT OFFICE.

FRANK B. WELLS, OF FISHKILL ON THE HUDSON, NEW YORK.

IMPROVEMENT IN BINDING MATHEMATICAL BOOKS.

Specification forming part of Letters Patent No. 83,345, dated October 20, 1868.

*To all whom it may concern:*

Be it known that I, FRANK B. WELLS, of Fishkill on the Hudson, in the county of Dutchess and State of New York, have invented the application or insertion of silicated leaves within mathematical, rhetorical, grammatical, and other works in which they may be used; and I do hereby declare that the following is a full and exact description of the same.

The nature of my invention consists in providing mathematical and other works with silicated leaves firmly bound in the same, as per inclosed sample.

To enable others skilled in the art to make and use my invention, I will proceed to describe the same.

I take silicated leaves, prepared only on one side, fold them so that the prepared parts come together, lay them in between the leaves of the book at convenient intervals apart, so that they may be bound or fastened in with the leaves of the book firmly, thus constituting an essential portion of the same, upon which any penciling or writing may be done, thus combining slate and arithmetic, grammar and black-board, &c.

These leaves are prepared only on one side, in order, first, that they may be the more pliable as a leaf, and, second, that in cleansing them the dampness will not come in contact with the printed portions of the book, so that the adjoining leaves will not be affected with dampness nor become soiled when the book is closed.

What I claim as my invention, and desire to secure by Letters Patent, is—

The insertion of these silicated leaves in the aforementioned works in which they may be used, said leaves to be bound in the book firmly, inserting any number desired, according to the nature and the size of the volume, or they may be simply fastened in any way, that they may be removed, changed, or replaced, or new ones inserted, at pleasure, if so thought to be more practicable.

FRANK B. WELLS.

Witnesses:
J. HERVEY COOK,
W. A. BAXTER.